C. L. DUENKEL.
ELEVATOR METER AND INDICATOR.
APPLICATION FILED APR. 9, 1908.

993,766.

Patented May 30, 1911.
4 SHEETS—SHEET 1.

WITNESSES:

INVENTOR
Charles L. Duenkel
BY
E. W. Marshall
ATTORNEY

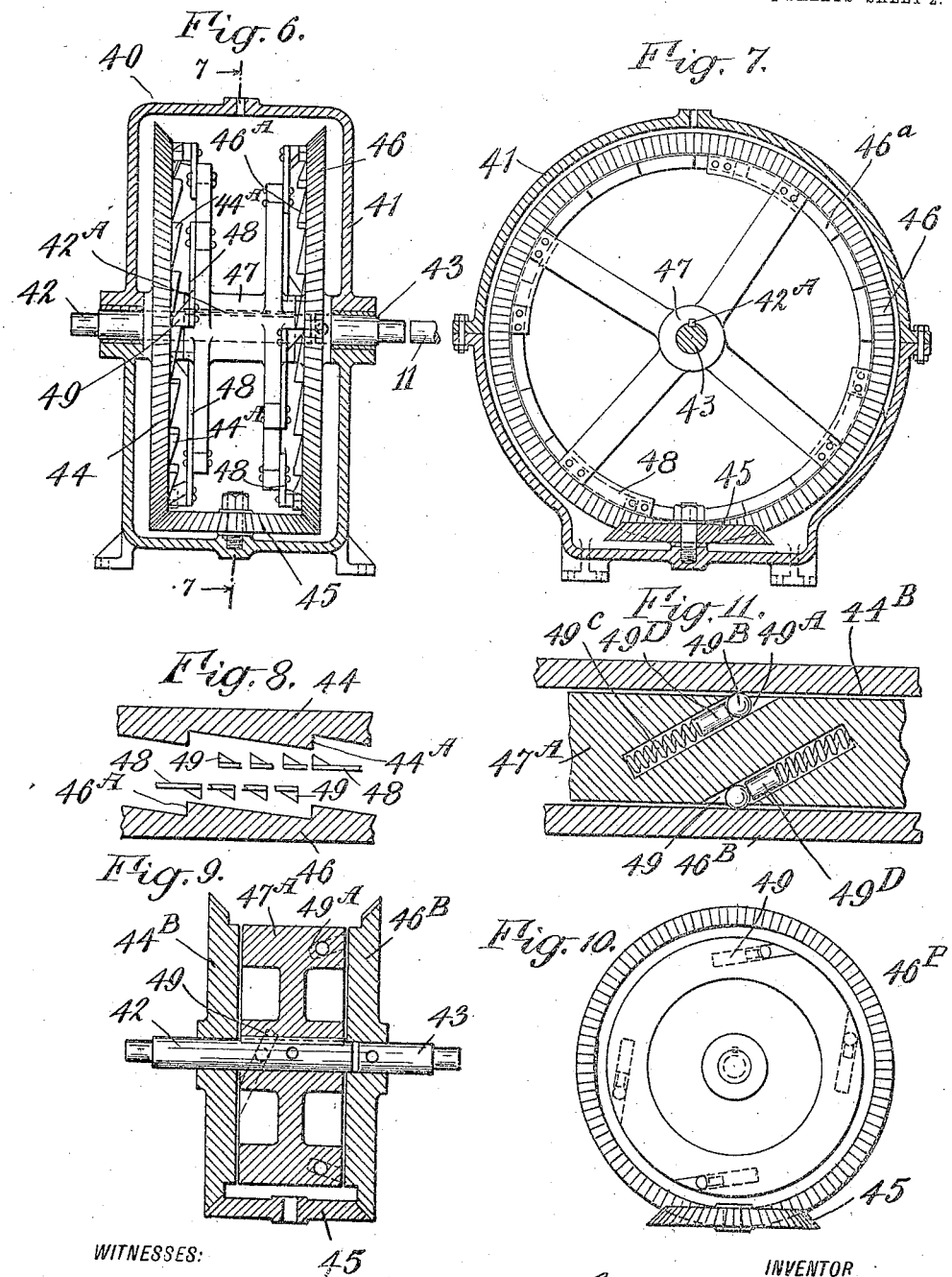

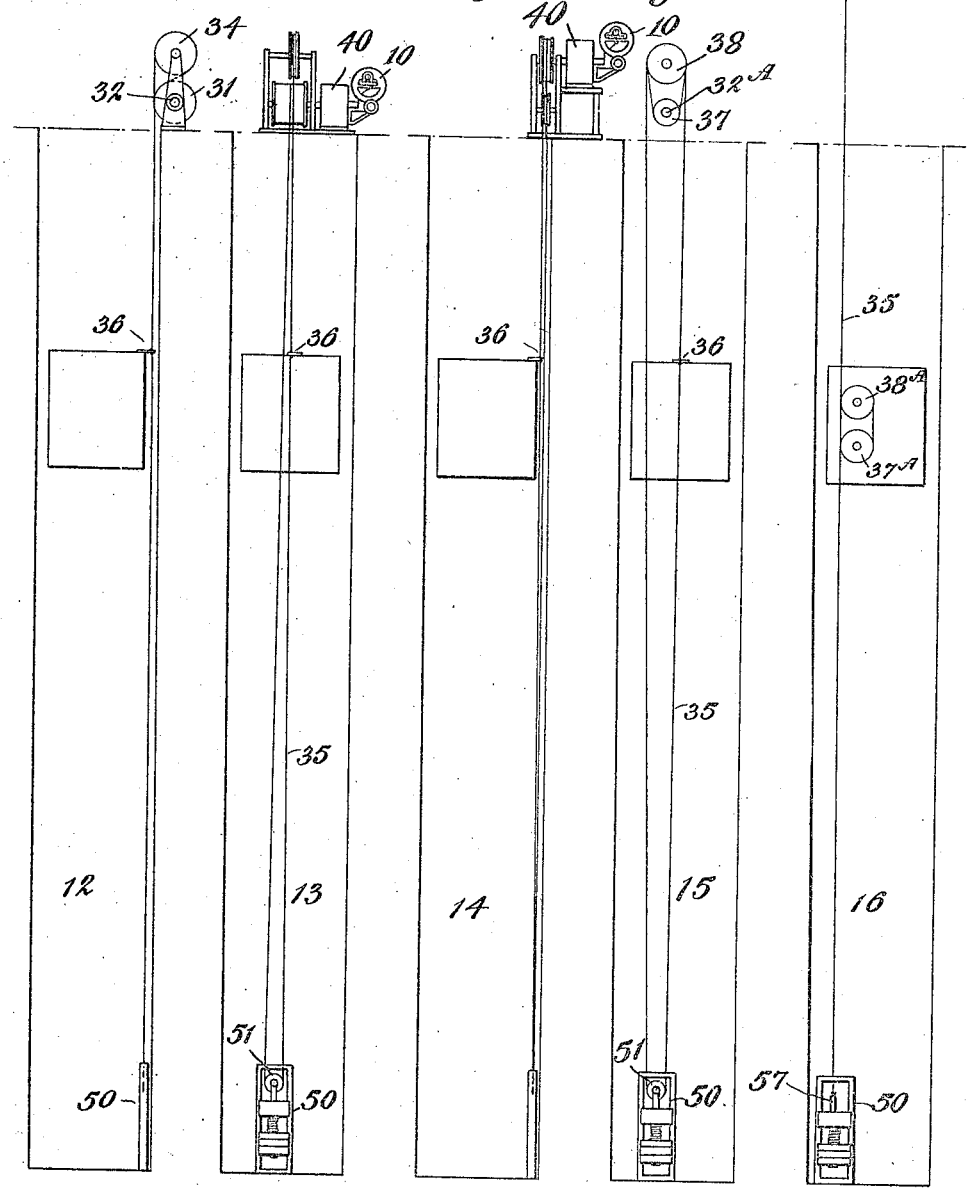

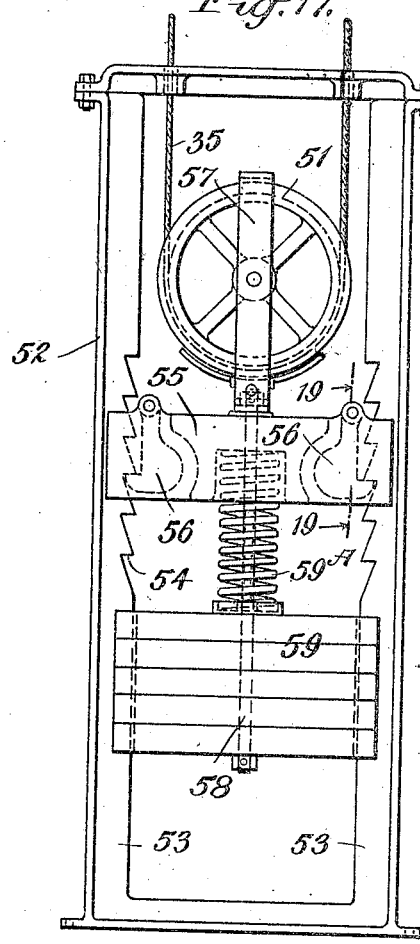

UNITED STATES PATENT OFFICE.

CHARLES L. DUENKEL, OF EAST ORANGE, NEW JERSEY, ASSIGNOR OF ONE-HALF TO HENRY AUGUST VERGES, OF MILWAUKEE, WISCONSIN.

ELEVATOR METER AND INDICATOR.

993,766.	Specification of Letters Patent.	Patented May 30, 1911.

Application filed April 9, 1908. Serial No. 426,033.

*To all whom it may concern:*

Be it known that I, CHARLES L. DUENKEL, a citizen of the United States, and a resident of the city of East Orange, in the county of Essex and State of New Jersey, United States of America, have invented certain new and useful Improvements in Elevator Meters and Indicators, of which the following is a specification.

My invention relates to an elevator meter and indicator for the purpose of registering and showing the speed and distance of travel of elevator cars.

To these ends the invention consists in the arrangement and construction of parts described in the following specification, the novel features whereof are pointed out in claims.

Figure 1:
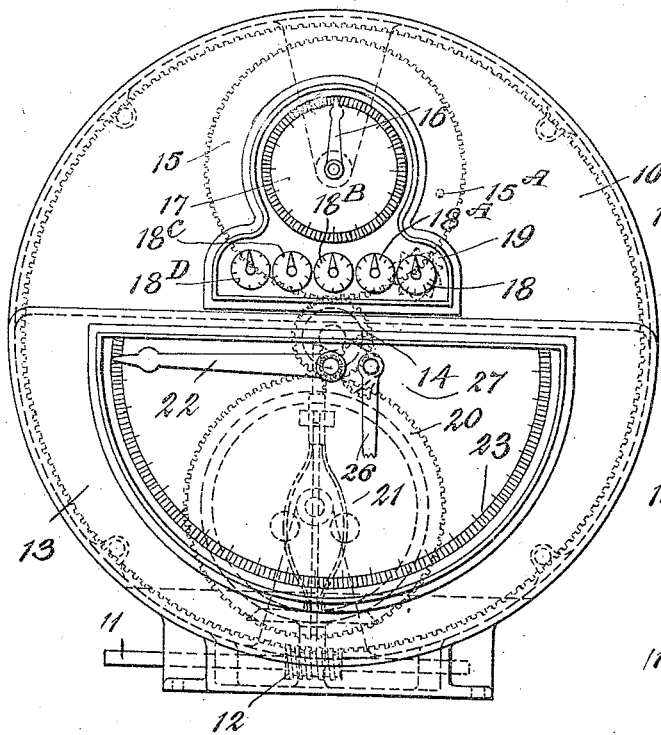
Figure 2:
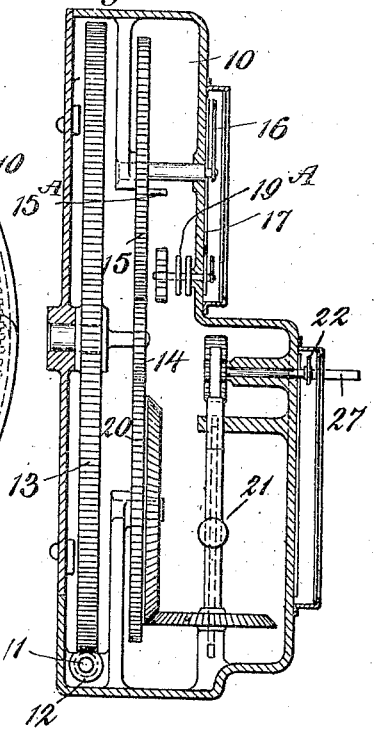
Figure 3:
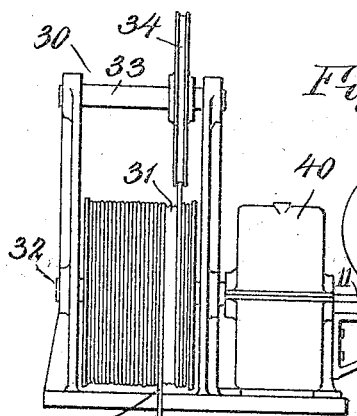
Figures 4, 5:
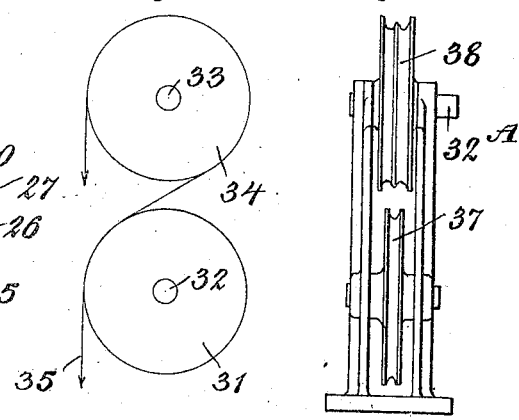

Referring to the drawings, Figure 1 is a front elevation of a registering and indicating device. Fig. 2 is a sectional side elevation of the same. Fig. 3 is a front elevation of a driving or actuating mechanism which I use in conjunction with my meter. Fig. 4 is a diagrammatic representation of some of the parts of said actuating mechanism showing the manner in which the ropes are arranged. Fig. 5 is a front elevation of a modified form of actuating mechanism. Fig. 6 is a sectional side elevation of one form of continuous motion device which I use in conjunction with my invention. Fig. 7 is a sectional front elevation through the line 7—7 of Fig. 6. Fig. 8 is a development of certain portions of the mechanism shown in Figs. 6 and 7, illustrating the principles on which this device operates. Fig. 9 is a sectional end elevation of a modified form of continuous motion device. Fig. 10 is a front elevation of the form of continuous motion device illustrated in Fig. 9. Fig. 11 is a developed sectional view of a portion of the form of continuous motion device illustrated in Figs. 9 and 10, showing more clearly the method of its operation. Fig. 12 is a diagrammatic side elevation of an elevator car meter and indicator device and actuating mechanism showing the manner in which these parts are connected together. Fig. 13 is a front elevation of the same parts connected together in the same manner. Fig. 14 is a front elevation of an elevator car meter and indicator device together with a modified form of actuating mechanism. Fig. 15 is a diagrammatic representation in side elevation, of the parts shown in Fig. 14. Fig. 16 illustrates in side elevation a still further modification of the arrangement of the parts which comprise my invention. Fig. 17 is a front elevation of a tension device which I use in conjunction with the other parts of my apparatus. Fig. 18 is a sectional side elevation of this device. Fig. 19 is section of a pawl arrangement used in conjunction with this tension device, the section in this figure being taken through the line 19—19 of Fig. 17. Fig. 20 is a sectional front elevation of a portion of a tension device similar to that shown in Fig. 17 showing in this case a modified form of holding mechanism. Fig. 21 is a similar view of another modification of the holding device which I sometimes use in conjunction with the tension arrangement which is herein shown.

Like characters of reference designate corresponding parts in all of the figures.

10 designates a casing inclosing the registering and indicating mechanism. A shaft 11, which is actuated by the movement of an elevator car in a manner which will be fully described hereinafter, runs in the base of this casing. A worm gear affixed to this shaft is in mesh with a large wheel gear 13 centrally pivoted within the casing 10. The lower portion of the casing is so constructed that the worm gear may be surrounded by an oil bath. A pinion 14 is connected to run with the gear 13. This pinion is in mesh with a gear 15, the journal of which is carried through the face of the casing and carries an indicating pointer 16. A graduated dial 17 is provided directly behind this pointer.

18, 18$^A$, 18$^B$, 18$^C$ and 18$^D$ designate a plurality of small indicating dials. A star wheel 19 is provided with one of these dials and is in the path of movement of a pin 15$^A$ projecting from the gear 15.

The parts above described are arranged to register the distance of travel of an elevator car. The various connections are preferably so proportioned that one mile of travel of the elevator car will give one complete revolution to the pointer 16. The dial 17 may be divided up into fractions of a mile such, for example, as tenths and hundredths. The star wheel 19 has ten points with which the pin 15$^A$ engages in such a manner that for each revolution of the gear 15 and the pointer 16 the star wheel and the pointer which is over the small indicating dial 18 is advanced one tenth of a revolution. Consequently, the dial 18 is preferably subdivided into ten equal parts and one complete revolution of its pointer will record ten car miles of travel. The mechanisms of the various small indicating dials are connected together by gearing 19$^A$ with a ten-to-one reduction between each so that a revolution of the pointer over the dial 18$^A$ registers one hundred car miles of travel; that over dial 18$^B$ one thousand miles; that over dial 18$^C$ ten thousand miles, and that over dial 18$^D$ one hundred thousand car miles. Obviously, the proportions and ratios may be other than those described; for example, the various parts may be so arranged that one revolution of the pointer 16 will indicate one round trip of the car's travel so that the small indicating dials will show the total number of round trips the car to which the meter is connected has made. Any desired number of dials may be used. With the number of dials herein shown this instrument will register the travel of the car for many years and will then repeat itself. The pinion 14 is also in mesh with a gear 20 which, through a train of gearing or other suitable mechanism, is arranged to drive a centrifugal actuating mechanism 21 similar to a speed governor, but in this case connected to actuate an indicating pointer 22. Back of this pointer is a graduated dial 23 which is sub-divided into spaces indicating the speed at which the car is running. These graduations are preferably made to indicate the speed of the car in feet per minute. The faces of the dials on this instrument are perfectly protected by glass covers as shown in the drawings.

In Fig. 3 the casing 10 is shown mounted upon a driving or actuating mechanism 30 by means of a bracket 24. In this figure a recording instrument 25 is shown connected with the speed indicator by means of a rod 26 which is connected with a pin 27 projecting from a portion of the speed indicator mechanism. This recording instrument may be of any standard make and is used whenever it is desired to keep a record of the speed of a car. The actuating mechanism comprises a drum 31 affixed to a shaft 32. Above this drum is a fixed shaft 33 upon which a traveling sheave 34 is loosely mounted. The two ends of a driving rope or cable 35 are wound about the drum 31 in opposite directions and are affixed thereto. The actuating mechanism may be mounted at the top of an elevator shaft as is shown in Figs. 12 and 13. In such a case one portion of the rope 35 may be led down to the bottom of the elevator shaft and under a sheave 51 upon an automatic tension device 50. The other portion of the rope is carried from the drum over the traveling sheave 34 in the manner shown in Figs. 4 and 12, and thence down to the tension device 50. The sheave 51 is therefore in a loop in the driving rope 35. At a point intermediate the actuating mechanism and the tension device the driving rope is affixed to an elevator car as at 36. The function of the actuating mechanism and its connected parts is obviously to cause any movement of the elevator car to transmit a rotary motion to the shaft 32, proportional in speed and amount to the speed of the car and to the distance through which it travels.

In Fig. 5 a somewhat different arrangement of actuating mechanism is shown. In this case an idle sheave 37 is shown mounted upon a shaft. Above this a double grooved traction sheave 38 is secured to a driving shaft 32$^A$. In Figs. 14 and 15 the manner in which the driving rope 35 is connected with this form of driving mechanism is shown. In this case the ends of the driving rope are spliced or otherwise fastened together so that the rope forms an endless loop. The lower end of this loop is passed under the sheave 51 on the tension device 50 while the upper portion of the loop is carried up over the traction sheave 38 and under the idle sheave 37. By this arrangement the movement of the car transmits rotary motion to the shaft 32$^A$.

40 designates a continuous motion device which is used between the actuating mechanism and the recording instrument. In Figs. 6, 7 and 8 this device is shown somewhat in detail. It comprises a casing 41 which incloses the various parts of the apparatus and forms bearings for a shaft 42 which is connected with the shaft 32 of the actuating mechanism, and a shaft 43 which is connected with the shaft 11 of the registering and indicating instrument. Upon the shaft 42 a bevel-gear 44 is loosely mounted. The inner surface of this bevel-gear is provided with ratchet-teeth 44$^A$. 45 is a horizontally disposed bevel-gear in mesh with the bevel-gear 44 and with another bevel-gear 46 which is affixed to the shaft 43. The inner surface of the bevel-gear 46 is also provided with ratchet-teeth 46$^A$. The bevel-gears 44 and 46 are of the same diameter. Between these two bevel-gears and affixed to the shaft 42 by a key 42$^A$ is a spider 47 which carries upon a series of spring arms 48 a plurality of pawls 49 which are adapted to engage with the ratchet-teeth 44$^A$ and 46$^A$. The operation of this device is as follows: Whenever the shaft 42 is rotated in one direction or the other, its motion will be transmitted to the spider 47. If this rotation is in one direction the pawls on one side of the spider will engage with the ratchet teeth on the inner face of the bevel-gear on that side and will cause this motion to be transmitted to the shaft 43 in one direction. If the shaft 42 and the spider 47 are rotated in the opposite direction the pawls which perform the function which is described will now pass freely by the ratchet teeth on the bevel-gear on that side of the spider, but the pawls on the other side of the spider will engage with the ratchet teeth on the other bevel-gear, and the movement of the spider will be transmitted to the shaft 43 by these pawls. Consequently, the rotation of the shaft 43 will always be in the same direction regardless of the direction of rotation of the shaft 42 and its connected spider 47.

In Fig. 8 I have shown that the series of pawls 49 on one side of the spider are placed midway between the series of pawls on the other side of the spider. This arrangement is made so that whenever the rotation of the spider is reversed, one or the other of the bevel-gears will be caught by these pawls and rotated thereby with but little lost motion. In the drawings there are four arms of the spider 47 shown. It is obvious that this number of arms may be increased and that the greater the number of arms with the pawls which they support, the less will be the lost motion caused by reversing the rotation of the spider. It is to be noted that the casing inclosing this apparatus is so constructed that it may be partly filled with oil so that this mechanism may be freely lubricated at all times thereby.

Figs. 9 and 10 show a modification of the construction of the mechanism of the continuous motion device. In this case the bevel-gears 44^B and 46^B are connected together as before by the bevel-gear 45, but the inner faces of the two vertical gears are plain flat surfaces. The spider 47^A which is secured to the shaft 42 as before is, however, of a different construction. In this case its outer surfaces are carried out to a position adjacent to those of the inner faces of the vertical gears. In these surfaces of the spider holes 49^A are drilled obliquely in an opposite direction on the two surfaces of the spider. A ball 49^B is placed within each of these holes and is pressed outward by a spring 49^C acting upon an intermediate washer 49^D. The operation of this arrangement is similar to that described in conjunction with the first form of this mechanism, except that in this case the balls 49^A perform the function which was formerly described in conjunction with the pawls 49. The angle at which the holes 49^A are drilled is less than the angle of friction between the surfaces with which the balls contact. It is apparent then that whenever the spider 47^A is rotated in one direction the balls which I have provided in the holes on one of its surfaces will lock the spider and the bevel-gear which is adjacent to this surface together while the balls on the other side will be pushed back slightly and will not perform any function. Similarly, when the opposite rotation is given to the spider 47^A the balls upon the other side will engage with the other bevel-gear and cause the latter to move with the spider. Consequently, the direction of rotation of the shaft 43 will always be the same regardless of the direction of rotation of the shaft 42. As may be seen from Fig. 3, this continuous motion device is interposed between the actuating mechanism and the registering and indicating instrument so that the rotation of the shaft 32 of the actuating device is transmitted through the continuous motion device to the registering and indicating instrument, but its direction of rotation is rectified or made unidirectional. The various parts of the registering instrument therefore always rotate in one direction.

The tension device 50 is illustrated somewhat fully in Figs. 17, 18 and 19. In these figures 52 designates a stationary frame closed at the top and bottom and constructed to form a pair of vertical guide-rails 53, 53. A portion of each of these guide-rails may be arranged to form ratchet-teeth 54. A traveling cross-head 55 is adapted to fit within this frame and to move up and down over the guides. Pivoted pawls 56, 56 on either side of this cross-head are arranged to engage with the ratchet-teeth 54. The pivots for these pawls are so placed in respect to the center of gravity of the pawls that the latter always have a tendency to swing outward into engagement with the ratchet-teeth. Thus they lock the cross-head against upward movement. But the upper surfaces of the part of the guides which forms the ratchet-teeth will push the pawls back within the cross-head whenever the latter is moved downward. The purpose, therefore, of the ratchet-teeth and pawls is to lock the cross-head against upward movement without interfering with its moving freely downward. 57 designates a frame within which is pivoted the sheave 51. A rod 58 extends downward from this frame through the cross-head and supports one or more weights 59. These weights exert a downward pull upon the sheave 51 and have a tendency to take up any slack which may be in the driving rope 35. Between the upper surface of these weights 59 and the cross-head 55 one or more compression springs such as 59^A are provided. This, acting between the two parts above mentioned, increases the effect of the weights upon the tension of the driving rope 35. It may be seen that the cross-head will be supported by this spring. Whenever the driving ropes stretch sufficiently to lower the position of the sheave 51 and its connected parts, it will allow the cross-head to drop down until its pawls engage with one of the ratchet-teeth, which will then prevent any upward movement of the cross-head. The weights 59, however, through the intervention of the spring 59A, will allow more or less fluctuation of the position of the sheave 51 due to sudden strain coming upon the driving rope without affecting the position of the cross-head.

In Fig. 20 a modification of the holding pawls is shown. In this case the cross-head 55A is provided with obliquely disposed slots in which sliding pawl members 56A are provided. The bottoms of the slots are constructed with stops which limit the downward movement of the pawl members. It may be seen that when the parts are in the positions in which they are shown in the drawings, the cross-head is positively held against upward movement by the pawl member engaging with one of the ratchet-teeth and being seated against the stop at the bottom of its slot. It is also evident that this arrangement permits a free downward movement of the cross-head.

Fig. 21 illustrates a still further modification of holding device for the cross-head. The cross-head 55B in this case is provided with an opening opposite to the guide-rail 53, with an inclined surface. A ball or roller 56B is placed in each one of these openings between the inclined surface and the face of the guide. The inclination is such that any tendency to raise the cross-head 55B will cause the ball or roller 56B to be wedged between the face of the guides and the oblique surface and prevent upward movement of the cross-head. When the cross-head is moved downward, however, the ball or roller 56B will have no such effect but will allow the parts to pass each other freely.

The tension device which I have above described may be applied to other uses than that in connection with my registering and indicating instrument, such, for example, as for keeping the speed governor actuating ropes of elevators taut. If it is found in practice that the ratchet-teeth are too great a distance apart, parallel sets of ratchet-teeth with their points staggered may be used instead of a single set of ratchet-teeth on each side of the cross-head.

I have illustrated several modifications of the various parts of my apparatus to show that I do not confine myself to any specific form or construction.

I have also shown several ways in which the apparatus may be connected with an elevator car. All but one of the arrangements which I have described provide for placing the indicating and registering device at the top of the elevator hatchway, although, of course, by slightly changing the arrangement of the parts, the instrument may be placed at the lower portion of the elevator hatchway or other desired location. In Fig. 16 I have shown an arrangement whereby the instrument may be placed upon the car itself. In this case the driving rope 35 is affixed to a point above the travel of the car with its lower end directly affixed to the frame 57 of the tension device. Upon a side of the car two sheaves 37A and 38A are placed which correspond in function to the arrangement of the sheaves 37 and 38 previously described.

It is desirable to have the continuous motion device placed, as I have shown it, intermediate the actuating mechanism and the indicating and registering apparatus. This is because any given amount of lost motion which may take place in the continuous motion device will have its effect upon the shaft 11 before the motion is reduced through the worm-gear 12 and the gear 13 with which it engages, thereby minimizing any error in the result which might occur from such lost motion.

The meter and indicator together with its associated parts are applicable to other structures than elevators and may be used to cumulatively record the distance of travel and also to indicate and record the speed of any body having reciprocatory movement.

Whenever the apparatus is applied to an elevator, the gears and other parts may be proportioned to properly register and record the performance of any type of elevator. Instead of using the connections between the elevator car and the other parts of the apparatus, my apparatus may be connected with any moving part of the elevator such, for example, as the overhead sheaves, or with an ordinary governor rope which is connected to run with the car.

What I claim is,—

1. The combination of an elevator car, a stationary actuating mechanism, a rope connecting the actuating mechanism with the car, a meter, and intermediate mechanism connecting the meter with the actuating mechanism.

2. The combination of an elevator car, a stationary actuating mechanism, a meter connected therewith, a rope connecting the actuating mechanism with the car, and means for maintaining said rope under tension.

3. In combination with an elevator car, an actuating mechanism arranged to change the reciprocatory motion of the car into reversing rotary motion, a rope connecting the actuating mechanism with the car, a meter, and intermediate mechanism connecting the meter with the actuating mechanism, said intermediate mechanism being arranged to transmit the rotary movement of the actuating mechanism in either direction to the meter with a unidirectional rotary motion.

4. In combination with an elevator car, an actuating mechanism arranged to change the reciprocatory motion of the car into reversing rotary motion, a rope connecting the actuating mechanism with the car, an automatic tension device for said rope, a meter, an intermediate mechanism connecting the meter with the actuating mechanism, said intermediate mechanism being arranged to transmit the rotary movement of the actuating mechanism in either direction to the meter with a unidirectional rotary motion.

5. In combination with an elevator car, an actuating mechanism comprising a rotatable drum, a rope connecting said drum with the car, an instrument having a plurality of dials for cumulatively registering the distance of travel of the car, said instrument also having centrifugally governed mechanism for indicating the speed of the car, a recording apparatus, connected with said mechanism, and a continuous motion device comprising a reversibly rotating member, a shaft, and means for transmitting unidirectional rotation from said member to the shaft, said rotating member being connected with the actuating mechanism and said shaft being connected with the instrument.

6. In combination with an elevator car, a meter, an actuating mechanism, a rope connecting the actuating mechanism with the car, a driving rope connecting the actuating mechanism with the car, an idle sheave in the driving rope, a weight and a spring pulling the sheave in one direction, and intermediate mechanism connecting the meter with the actuating mechanism.

7. In combination with an elevator car, an actuating mechanism arranged to change the reciprocatory motion of the car into reversing rotary motion, a driving rope connecting the actuating mechanism with the car, an idle sheave in the driving rope, a weight and a spring pulling the sheave in one direction, a movable cross-head against which said spring acts, means for preventing the movement of the cross-head in one direction; a meter, intermediate mechanism connecting the meter with the actuating mechanism, said intermediate mechanism being arranged to transmit the reversing rotary movement of the actuating mechanism to the meter in a unidirectional rotary motion.

8. In combination with an elevator car, an actuating mechanism comprising a rotatable drum, a driving rope connecting said drum with the car, a weighted sheave in the driving rope, an instrument having a plurality of dials for cumulatively registering the distance of travel of the car, said instrument also having a centrifugally governed mechanism for indicating the speed of the car, a continuous motion device comprising reversing gears, a reversible rotating member between said gears, means for engaging said member with one of the gears when said member rotates in one direction, and with the other gear when the member rotates in the other direction; said continuous motion device being between the instrument and the actuating mechanism.

9. In combination with an elevator car, an actuating mechanism comprising a rotatable drum, a driving rope affixed to said drum and connected with the car, an idle sheave in the driving rope, a weight and a spring pulling the sheave in one direction, a movable cross-head against which said spring acts, means for preventing movement of the cross-head in one direction; an instrument having a plurality of dials for cumulatively registering the distance of travel of the car, said instrument also having centrifugally governed mechanism for indicating the speed of the car, and a continuous motion device connecting the said instrument with the actuating mechanism, said continuous motion device comprising reversing gears, a reversible rotating member between said gears, ratchet and pawl mechanism for engaging said member with one of the gears when said member rotates in one direction, and with the other gear when the member rotates in the other direction.

10. In combination with an elevator car, an actuating mechanism comprising a rotatable drum, a driving rope affixed to said drum and connected with the car, an automatic tension device for said rope, said tension device comprising an idle sheave in the driving rope, a weight and a spring pulling the sheave in one direction, a movable cross-head against which said spring acts, guides for the cross-head, ratchet and pawl mechanism allowing the cross-head to travel in the direction against the action of the spring but preventing it from moving in the opposite direction; an instrument having a plurality of dials for cumulatively registering the distance of travel of the car, said instrument also having centrifugally governed mechanism for indicating the speed of the car, a recording apparatus connected with said speed indicating mechanism, and a continuous motion device connecting said instrument with the actuating mechanism, said continuous motion device comprising reversing gears, a reversible rotating member between said gears, ratchet and pawl mechanism for engaging said member with one of the gears when said member rotates in one direction, and with the other gear when the member rotates in the other direction, thereby imparting a unidirectional rotary motion to the instrument.

11. In combination with a body having a reciprocatory movement of travel, a stationary mechanism having a rotary shaft, a rope connecting said mechanism with said body and arranged to cause the movement of the body to rotate said shaft, an idle sheave in engagement with said rope, means for moving said sheave in one direction to maintain the rope under tension, a device for preventing the movement of the sheave in the opposite direction, and a resilient connection between the sheave and said device.

12. In combination with an elevator-car, a stationary mechanism having a rotary shaft, a driving rope connecting said mechanism with the car and arranged to cause the travel of the car to rotate said shaft, an idle sheave in engagement with the driving rope, a weight and a spring arranged to pull the sheave in one direction to maintain said rope under tension, a movable cross-head against which said spring acts, and means for preventing the movement of the cross-head in one direction.

In testimony whereof I have signed my name to this specification in the presence of two subscribing witnesses.

CHARLES L. DUENKEL.

Witnesses:
ELLA LUCE,
ERNEST W. MARSHALL.